United States Patent
Lee et al.

(10) Patent No.: US 7,239,117 B2
(45) Date of Patent: Jul. 3, 2007

(54) PROGRAMMABLE INDUCTOR CURRENT CONTROL FOR DC-DC CONVERTERS

(75) Inventors: Cheung Fai Lee, Shatin (HK); Stephen Wai-Yan Lai, Kowloon (HK); Alvin Chit-Sang Chan, Tai Po (HK); David Chin-Tung Or, Kowloon (HK)

(73) Assignee: Solomon Systech Limited, New Territories (HK)

( * ) Notice: Subject to any disclaimer, the term of this patent is extended or adjusted under 35 U.S.C. 154(b) by 180 days.

(21) Appl. No.: 11/029,336

(22) Filed: Jan. 6, 2005

(65) Prior Publication Data

US 2006/0145675 A1 Jul. 6, 2006

(51) Int. Cl.
G05F 1/40 (2006.01)
(52) U.S. Cl. .................. 323/283; 323/288
(58) Field of Classification Search ............ 323/283, 323/284, 288
See application file for complete search history.

(56) References Cited

U.S. PATENT DOCUMENTS

| 4,148,097 A | 4/1979 | Deisch |
| 5,731,731 A | 3/1998 | Wilcox et al. |
| 5,982,160 A | 11/1999 | Walters et al. |
| 6,377,034 B1 | 4/2002 | Ivanov |
| 6,381,159 B2 | 4/2002 | Oknaian et al. |
| 7,042,203 B2 * | 5/2006 | Van Der Horn et al. .... 323/285 |
| 2002/0074975 A1 | 6/2002 | Culpepper et al. |

* cited by examiner

Primary Examiner—Shawn Riley
(74) Attorney, Agent, or Firm—Finnegan, Henderson, Farabow, Garrett & Dunner, L.L.P.

(57) ABSTRACT

A DC-DC converter circuit includes an inductor having an inductor current, an inductor current emulation circuit for producing an emulated inductor current, and a control circuit coupled with the emulation circuit for receiving the emulated inductor current and determining a peak inductor current for the DC-DC converter.

14 Claims, 7 Drawing Sheets

PROGRAMMABLE INDUCTOR CURRENT CONTROL FOR DC-DC CONVERTERS

DESCRIPTION OF THE INVENTION

Field of the Invention

The present invention generally relates to current switching control and, more particularly, to a system and method for programmable inductor current control for direct current ("DC") conversion.

BACKGROUND OF THE INVENTION

DC—DC power converters are commonly used for supplying power to electronic devices and systems, such as power supply devices, computers, printers and imaging systems. Such DC—DC converters are available in a number of configurations for outputting a desired voltage from a source voltage, including a buck or step down converter (FIG. 1), a boost converter (FIG. 2), and a flyback converter (FIG. 3). FIG. 1 is a circuit diagram of a DC—DC buck converter 100 having an inductor 102, a capacitor 104, switches 106a and 106b, along with a rising cycle path 108a and falling cycle path 108b, for producing an output voltage $V_{out}$ that is less than a source voltage $V_{in}$. FIG. 2 is a circuit diagram of a DC—DC boost converter 200 having an inductor 202, a capacitor 204, switches 206a and 206b, along with a rising cycle path 208a and falling cycle path 208b. FIG. 3 is a circuit diagram of a DC—DC flyback converter 300 having an inductor 302, a capacitor 304, switches 306a and 306b, along with a rising cycle path 308a and falling cycle path 308b.

In order to effect control of DC—DC converter and voltage regulator circuits, accurate measurement of inductor current is necessary. A common approach for sensing an output inductor current in a buck converter (FIG. 1) utilizes a sensing resistor connected in series with the output inductor. The output inductor current is reconstructed as a differential voltage across the sensing resistor. The output voltage is then regulated with current mode control, where the sensed signal is used for output voltage feedback. An example of such a DC—DC converter with a sensing resistor is shown in U.S. Pat. No. 5,731,731. Other examples of direct sensing of inductor current for DC—DC converter control include those shown in U.S. Pat. Nos. 5,982,160 and 6,377,034. FIG. 4 is a circuit diagram of a conventional DC—DC buck converter 400 with a control circuit 402, a sensing circuit 404 and a sensing resistor 406. The sensing resistor value, however, must be sufficiently large in magnitude in order to keep the sensed signal above noise. A serious efficiency drawback results from power being unnecessarily dissipated by the sensing resistor.

Indirect sensing or deriving inductor current for DC—DC converter control is also available. Examples of indirect sensing of inductor current include those shown in U.S. Pat. No. 6,381,159 and U.S. Patent Application Publication No. US 2002/0074975. Although indirect sensing does not require a sensing resistor, a drawback is the requirement that internal nodes of the converter be tapped for internal voltages, which results in additional circuitry and signal pins.

There is thus a general need in the art for a system and method for inductor current control that can overcome the aforementioned shortcomings in the art. A particular need exists for a system and method for inductor current control in DC—DC converters that is efficient, and also minimizes power dissipation problems. A further need exists for a system and method for inductor current control in DC—DC converters with efficient and optimized circuit design.

SUMMARY OF THE INVENTION

Accordingly, the present invention is directed to a system and method for controlling current in DC—DC converters that obviate one or more of the problems due to limitations and disadvantages of the related art.

In accordance with the purpose of the invention as embodied and broadly described, there is provided a system and method for direct current ("DC") power conversion with programmable inductor current control.

Consistent with the present invention, there is provided a system with DC power conversion. The system comprises a DC—DC converter circuit including an inductor, an inductor current emulation circuit to emulate a current through the inductor and to produce a signal representative of the emulated inductor current, and a control circuit coupled to the emulation circuit to receive the signal representative of the emulated inductor current and to control a peak inductor current for the DC—DC converter.

Also consistent with the present invention, there is provided a power conversion system comprising a power converter including an inductor and an emulation circuit for coupling to a first voltage supply, a second voltage supply and a ground terminal. The emulation circuit includes a first transistor for coupling between the first voltage supply and the ground terminal; a programmable resistor coupled between the first transistor and the ground terminal; an amplifier having a positive input for coupling to the second voltage, a negative input coupled between the first transistor and the programmable resistor, and an output coupled to a gate of the first transistor; a programmable capacitor for coupling between the first voltage supply and the ground terminal, so that when the capacitor is coupled to the first voltage supply an emulated inductor current flows through the capacitor and an emulated inductor voltage is provided across the capacitor; a switch connected across the programmable capacitor; a comparator to compare the emulated inductor voltage and a reference voltage; and a logic circuit responsive to the output of the comparator to operate the switch to determine an inductor voltage limit.

Further consistent with the present invention, there is provided a power conversion method comprising providing a converter circuit with an inductor having an inductor current, emulating the inductor current, producing an emulated inductor voltage, comparing a reference voltage with the emulated inductor voltage, and determining an inductor voltage limit based on a result of the comparing step.

Additional features and advantages of the invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and, together with the description, serve to explain the principles of the invention.

DESCRIPTION OF THE EMBODIMENTS

Reference will now be made in detail to embodiments of the invention, which are illustrated in the accompanying drawings. Wherever possible, the same reference numbers will be used throughout the drawings to refer to the same or like parts.

Figure 1:
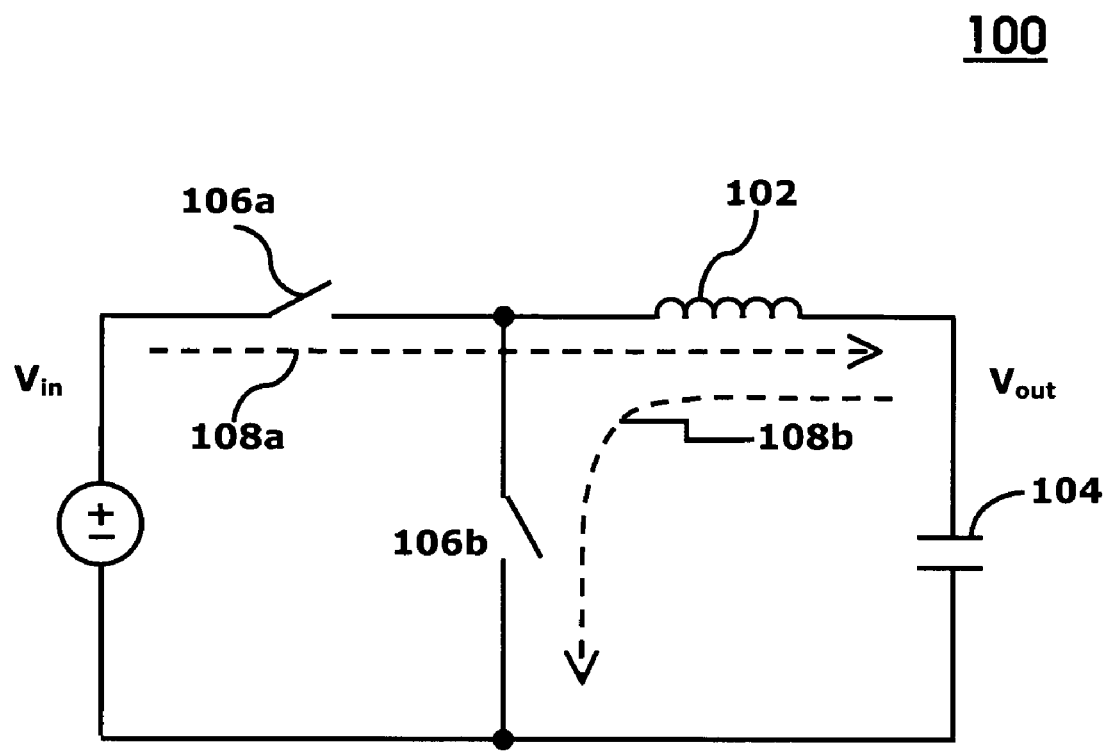
FIGS. 1, 2 and 3 are circuit diagrams respectively illustrating a conventional DC—DC buck converter, a boost converter, and a flyback converter.
Figure 2:
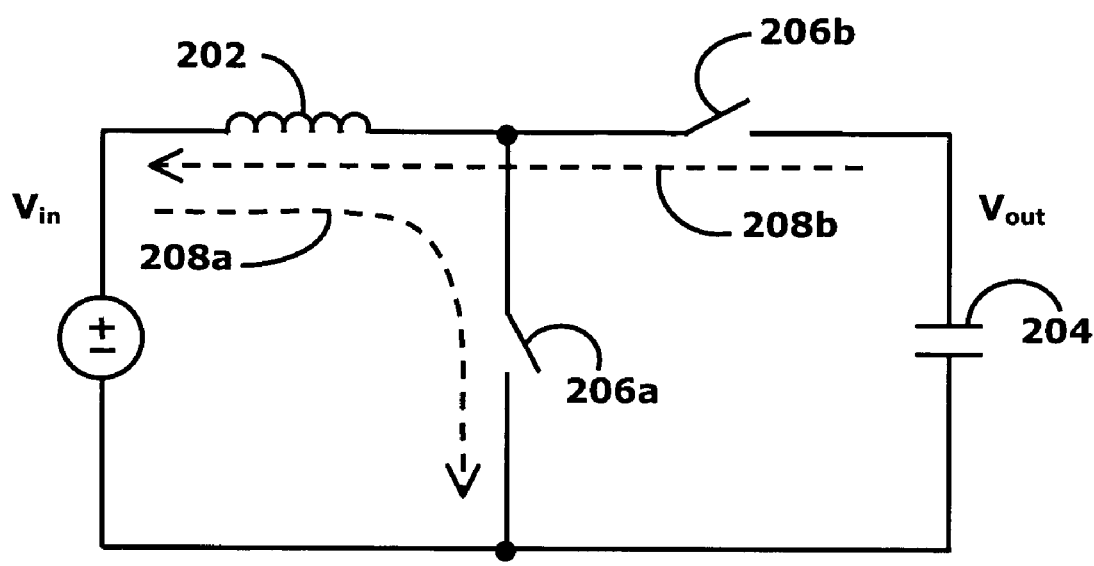
Figure 3:
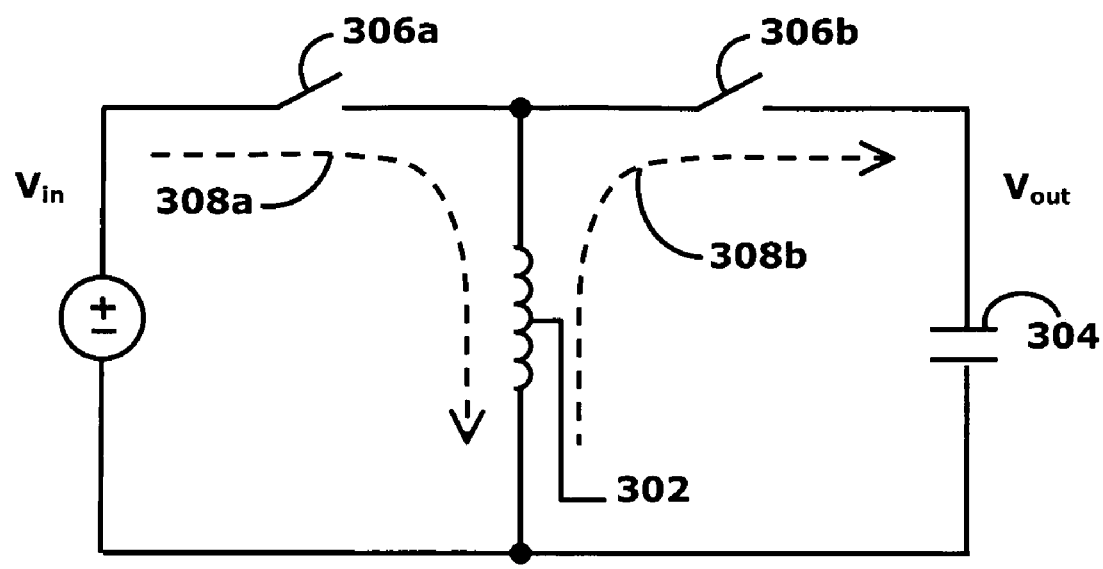
Figure 4:
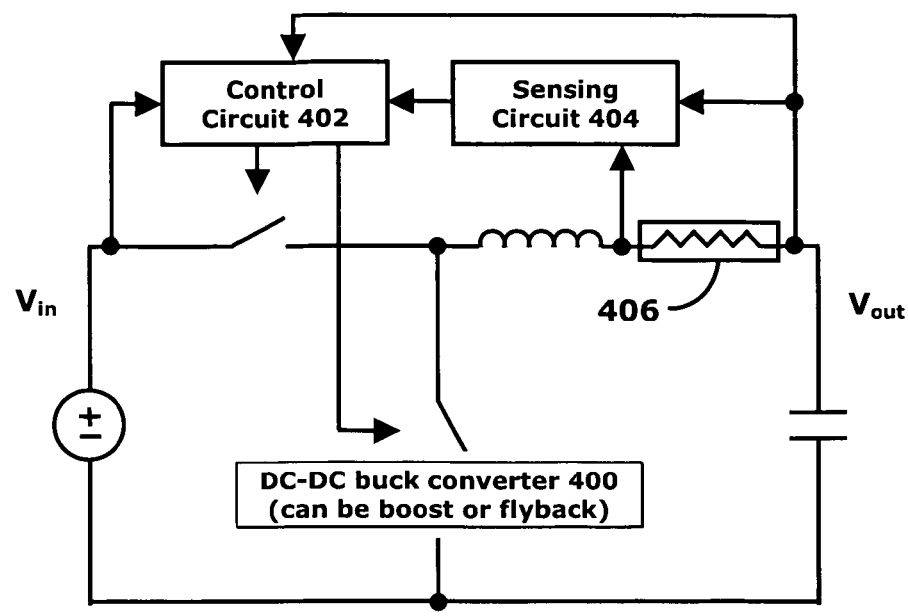
FIG. 4 is a circuit diagram illustrating a conventional DC—DC buck converter with a sensing circuit and a sensing resistor for sensing an inductor current.
Figure 5:
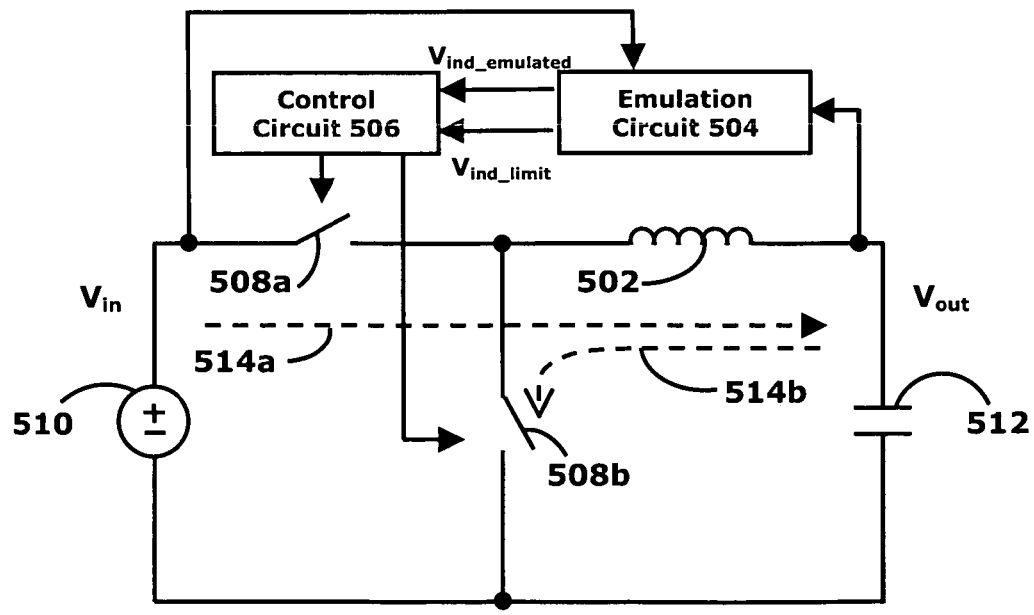
FIGS. 5, 6 and 7 are circuit diagrams illustrating embodiments of an inductor current emulation system and circuit respectively implemented with a DC—DC buck converter, a boost converter, and a flyback converter, according to embodiments of the present invention.

FIG. 5 is a circuit diagram illustrating an embodiment of an inductor current emulation circuit implemented with a DC—DC buck converter 500. Buck converter 500 includes an inductor 502 through which an inductor current flows, an inductor current emulation circuit 504 for producing an emulated inductor voltage signal $V_{ind\_emulated}$, a control circuit 506 coupled to the emulation circuit 504 to receive the emulated inductor voltage signal $V_{ind\_emulated}$ and to determine a peak inductor current for buck converter 500. Control circuit 506 is coupled to a pair of switches 508a and 508b in buck converter 500. Voltage source 510 supplies an input voltage $V_{in}$, which is also coupled to emulation circuit 504 at a point between voltage source 510 and switch 508a. An output voltage $V_{out}$ of buck converter 500 is measured across a capacitor 512 and is also supplied to emulation circuit 504. Emulation circuit 504 also determines an inductor voltage limit signal $Vind\_limit$, which is provided to control circuit 506.

In this manner, a closed control loop is formed to feed back the emulated inductor voltage signal $V_{ind\_emulated}$ and inductor voltage limit signal $V_{ind\_limit}$ to control circuit 506, which controls the operation of switches 508a and 508b in accordance therewith, to control the current flow in a rising cycle current path 514a and in a falling cycle current path 514b.

Figure 6:
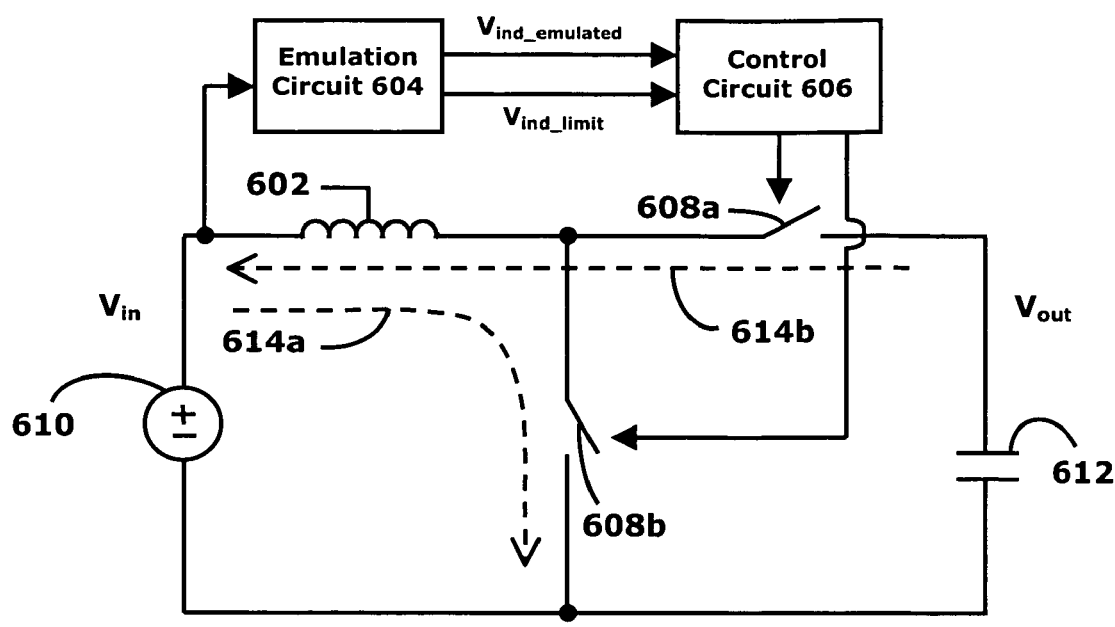

FIG. 6 is a circuit diagram illustrating an embodiment of an inductor current emulation system and circuit implemented with a DC—DC boost converter 600. Boost converter 600 includes an inductor 602 through which an inductor current flows, an inductor current emulation circuit 604 for producing an emulated inductor voltage signal $V_{ind\_emulated}$, a control circuit 606 coupled to the emulation circuit 604 to receive the emulated inductor voltage signal $V_{ind\_emulated}$ and to determine a peak inductor current for boost converter 600. Control circuit 606 is coupled to a pair of switches 608a and 608b in boost converter 600. A voltage source 610 supplies an input voltage $V_{in}$, which is also supplied to emulation circuit 604 at a node between voltage source 610 and inductor 602. An output voltage $V_{out}$ of boost converter 600 is measured across a capacitor 612. Emulation circuit 604 also determines an inductor voltage limit signal $V_{ind\_limit}$, which is provided to control circuit 606.

In this manner, a closed control loop is formed to feed back the emulated inductor voltage signal $V_{ind\_emulated}$ and inductor voltage limit signal $V_{ind\_limit}$ to control circuit 606, which controls the operation of switches 608a and 608b in accordance therewith, to control the current flow in a rising cycle current path 614a and in a falling cycle current path 614b.

Figure 7:
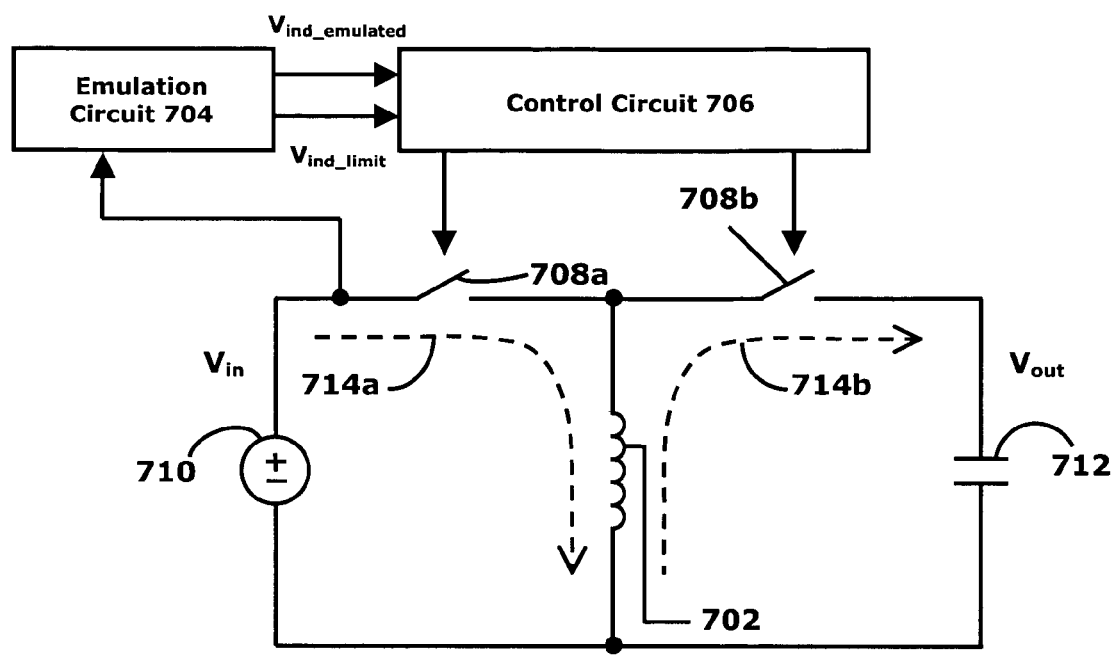

FIG. 7 is a circuit diagram illustrating an embodiment of an inductor current emulation system and circuit implemented with a DC—DC flyback converter 700. Flyback converter 700 includes an inductor 702 through which an inductor current flows, an inductor current emulation circuit 704 for producing an emulated inductor voltage signal $V_{ind\_emulated}$, a control circuit 706 coupled to the emulation circuit 704 to receive the emulated inductor voltage signal $V_{ind\_emulated}$ and to determine a peak inductor current for flyback converter 700. Control circuit 706 is coupled to a pair of switches 708a and 708b in flyback converter 700. A voltage source 710 supplies an input voltage $V_{in}$, which is also supplied to emulation circuit 704 at a point between voltage source 710 and switch 708a. An output voltage $V_{out}$ of flyback converter 700 is measured across a capacitor 712. Emulation circuit 704 also determines an inductor voltage limit signal $V_{ind\_limit}$, which is provided to control circuit 706.

In this manner, a closed control loop is formed to feed back the emulated inductor voltage signal $V_{ind\_emulated}$ and inductor voltage limit signal $V_{ind\_limit}$ to control circuit 706, which controls the operation of switches 708a and 708b in accordance therewith, to control the current flow in a rising cycle current path 714a and a falling cycle current path 714b.

Each of DC—DC converters 500, 600 and 700 of FIGS. 5, 6 and 7 includes an inductor 502, 602 and 702, respectively. The voltage across and current through the inductor are related by the following expression:

$$V_L = L\left(\frac{dI_L}{dt}\right) \quad (1)$$

where $V_L$ is the voltage across the inductor, L is the inductance of the inductor and $I_L$ is the inductor current. Rearranging the mathematical terms, a rising slope S of the inductor current can be represented as $$S = \frac{dI_L}{dt} = \frac{V_L}{L} \quad (2)$$

For a buck converter, such as DC—DC converter 500 of FIG. 5, a rising slope $S_{buck}$ of the inductor current can be represented as $$S_{buck} = \frac{V_L}{L} = \frac{V_{in} - V_{out}}{L} \quad (3)$$

where $V_{in}$ is the input voltage of the converter and $V_{out}$ is the output voltage of the converter. Similarly for a boost converter such as DC—DC converter 600 of FIG. 6, a rising slope $S_{boost}$ of the inductor current can be represented as $$S_{boost} = \frac{V_L}{L} = \frac{V_{in}}{L} \qquad (4)$$

For a flyback converter such as DC—DC converter 700 of FIG. 7, a rising slope $S_{flyback}$ of the inductor current can be represented as $$S_{flyback} = \frac{V_L}{L} = \frac{V_{in}}{L}. \qquad (5)$$

Knowing the rising slopes, the inductor current $I_L$ of the converter can be expressed as $$\begin{aligned} I_L &= S \times t \qquad (6) \\ &= \frac{V_{in} - V_{out}}{L} \times t \text{ for buck converter, or} \\ &= \frac{V_{in}}{L} \times t \text{ for boost/flyback converter} \end{aligned}$$

where t is a ramp up time of the inductor current. The ramp up time t is controlled by the closed-loop feedback circuitry, including control circuits 506, 606 and 706 of FIGS. 5, 6 and 7, respectively.

Figure 8:
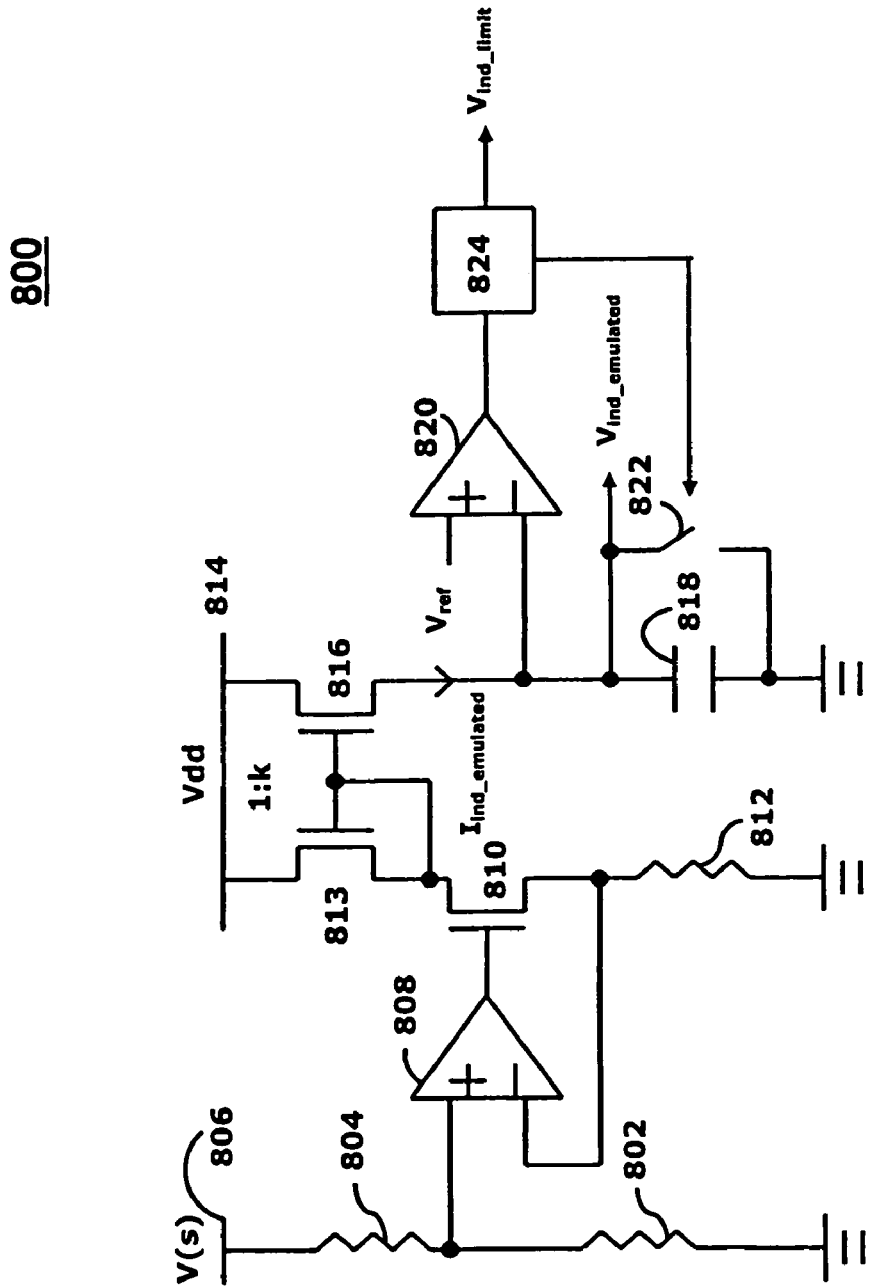
FIG. 8 is a circuit diagram illustrating an inductor current emulation circuit according to an embodiment of the present invention.

FIG. 8 is a circuit diagram illustrating an inductor current emulation circuit 800 according to an embodiment of the present invention. Emulation circuit 800 can be implemented as any one of emulation circuits 504, 604 and 704 of FIGS. 5, 6 and 7, respectively. Referring to FIG. 8, emulation circuit 800 includes a pair of resistors 802 and 804 coupled between a voltage source 806 (V(s)) and ground. A positive input of an auxiliary amplifier 808 is connected to a point between resistors 802 and 804. The output of auxiliary amplifier 808 is coupled to the gate of a transistor 810, whose source is connected to a negative input of auxiliary amplifier 808 and to ground through an on-chip resistor 812 which is programmable, e.g., by control bits. A transistor 813 has its source coupled to the drain of transistor 810 and its drain coupled to a supply voltage 814 ($V_{dd}$). A transistor 816 has its drain coupled to supply voltage 814 and its source coupled to ground through an on-chip capacitor 818 which is programmable, e.g., by control bits. The respective gates of transistors 813 and 816 are coupled together and to the drain of transistor 810. The connection of transistors 813 and 816 forms a current mirror having a current multiplication factor k. A comparator 820 is coupled to receive a reference voltage $V_{ref}$ on its positive input, and its negative input is coupled to a point between the source of transistor 816 and capacitor 818 to thereby receive a voltage across capacitor 818. A switch 822 is coupled across capacitor 818. A programmable logic circuit 824, having logic elements such as logic gates and flip-flops, is coupled to receive the output of comparator 820 and provides an output signal for controlling the position of switch 822. Circuit 824 functions to provide the logic decision to open or close switch 822, and provides the inductor voltage limit signal $V_{ind\_limit}$ according to the output of comparator 820. Circuit 824 also provides the inductor voltage limit signal $V_{ind\_limit}$ noted above in converters 500, 600 and 700. Circuit 824 generates the inductor voltage limit signal $V_{ind\_limit}$ based on the result of comparing the emulated inductor voltage signal $V_{ind\_emulated}$ and a preset reference voltage $V_{ref}$.

As more fully explained below, inductor emulation circuit 800 generates an inductor emulation current $I_{ind\_emulated}$ that flows through transistor 816. Based on the inductor emulation current $I_{ind\_emulated}$, circuit 800 outputs the emulated inductor voltage signal $V_{ind\_emulated}$ noted above in converters 500, 600 and 700.

In converters 500, 600, and 700, both the emulated inductor voltage signal $V_{ind\_emulated}$ and the inductor voltage limit signal $V_{ind\_limit}$ are provided by emulation circuits 504, 604, and 704 to control circuits 506, 606, and 706, respectively, as shown in FIGS. 5, 6, and 7.

In the operation of emulation circuit 800, the charge time of capacitor 818 is used as the ramp up time t for the inductor current in the DC—DC converter, e.g., converters 500, 600 and 700 of FIGS. 5, 6, and 7, respectively. The following relationships are based on the circuit arrangement of emulation circuit 800:

$$\begin{aligned} V_{ind\_emulated} &= I_{ind\_emulated} \times \frac{t}{C} \qquad (7) \\ &= \left[ \frac{V(s) \times R_2}{(R_1 + R_2)} \times \frac{1}{R} \times k \right] \times \frac{t}{C} \end{aligned}$$

where C corresponds to programmable on-chip capacitor 818, R corresponds to programmable on-chip resistor 812, and $R_1$ and $R_2$ correspond to resistors 804 and 802, respectively. The parameter k is the above described multiplication factor of the current mirror formed by transistors 813 and 816. As a result, the emulated voltage signal $V_{ind\_emulated}$ can be used in place of a conventional sensed inductor voltage (e.g., sensed by a sensing resistor) for current-mode DC—DC converter control. By comparing $V_{ind\_emulated}$ with reference voltage $V_{ref}$ at comparator 820, the resulting voltage signal $V_{ind\_limit}$ can be generated to set the peak current of the DC—DC converter by on-off control via logic circuit 824 and switch 822. Circuit 824 generates a control signal representing the inductor voltage limit signal $V_{ind\_limit}$ based on the results of comparing the emulated inductor voltage signal $V_{ind\_emulated}$ and a preset reference voltage $V_{ref}$. Inductor voltage limit signal $V_{ind\_limit}$ is active when emulated inductor voltage signal $V_{ind\_emulated}$ reaches the value of $V_{ref}$, i.e., when the desired current limited is reached as determined by the voltage on capacitor 818 developed by charging with current $I_{ind\_emulated}$. Circuit 824 controls operation of switch 822 and closes switch 822 when the desired current limit is reached. This will discharge capacitor 818 and it will be ready for use in the next clock cycle. At the start of the next clock cycle, programmable logic circuit 824 opens the switch 822, and capacitor 818 is charged up until $V_{ind\_emulated}$ is equal to $V_{ref}$, which then triggers the inductor voltage limit signal $V_{ind\_limit}$. This is repeated from cycle to cycle during the operation of the inductor current emulation circuit 800.

The reference voltage $V_{ref}$ can be set using control bits. A higher $V_{ref}$ setting corresponds to a higher current limit, as it takes a longer time for emulated inductor current $I_{ind\_emulated}$ to charge up the emulated inductor voltage signal $V_{ind\_emulated}$ of the capacitor 818 to the preset reference voltage $V_{ref}$. Setting $V_{ind\_emulated}$ equal to $V_{ref}$ provides:

$$V_{ref} = \left[\frac{V(s) \times R_2}{(R_1 + R_2)} \times \frac{1}{R} \times k\right] \times \frac{t}{C} \qquad (8)$$

$$t = \frac{V_{ref} \times C \times (R_1 + R_2) \times R}{V(s) \times R_2 \times k}$$

where V(s) can be set to $V_{in}$ for the case of boost and flyback converters such as converters 600 and 700, respectively, and set to $V_{in}$-$V_{out}$ for buck converters such as buck converter 500. In doing so, $V_{in}$ and -$V_{out}$ can be cancelled out after substituting equation (8) into equation (6), compensating for variations therein. The emulated peak inductor current can thus be represented by the following:

$$I_{L\_peak} = \frac{V_{ref} \times C \times (R_1 + R_2) \times R}{R_2 \times k \times L} \qquad (9)$$

Therefore, the peak inductor current can advantageously be determined by operation of emulation circuit 800 without the need of actually sensing or monitoring the converter circuit output. It is only dependent on the values of R, C and L, and is compensated for variations in the input and output voltages. In the present implementation of the illustrated embodiment, resistor 812 and capacitor 818 are both on-chip and programmable by control bits, so their values can be adjusted to match the inductance value of the external inductor employed.

As described above, DC—DC converters consistent with the present invention can be implemented in a system with a number of converter topologies, such as buck, boost and flyback converter topologies. They are also suitable for use in both continuous conduction mode ("CCM") and discontinuous conduction mode ("DCM") operation. A difference between the CCM and DCM configurations is that the inductor current in CCM has a DC offset component. The AC components are the same in both CCM and DCM configurations. As the emulation circuit consistent with the present invention emulates and controls the inductor current using the information of the AC components only, there is no substantial difference in implementing the principles of the present invention in CCM and DCM configurations. The same emulation circuit consistent with the present invention can advantageously be implemented in both CCM and DCM configurations without any special modification.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A system with DC power conversion, comprising:
   a DC—DC converter circuit comprising an inductor to pass an inductor current and electronic switches to receive periodic driving waveforms;
   an emulation circuit coupled to receive an input voltage of the converter circuit or input and output voltages of the converter circuit to generate emulation signals that represent the inductor current and a peak limit of the inductor current, the emulation signals being generated based on an inductance value of the inductor and either the input voltage or input and output voltages of the converter circuit, but without direct or indirect sensing or monitoring of the actual or a scaled version of the inductor current; and
   a control circuit coupled to the emulation circuit to receive the emulation signals to generate the driving waveforms, in accordance with a topology and operation mode of the converter, to drive the electronic switches.

2. The system of claim 1, wherein the DC—DC converter circuit comprises a topology of a buck converter, a boost converter, and a flyback converter, operating in either a continuous conduction mode or a discontinuous conduction mode.

3. The system of claim 1, wherein the emulation circuit comprises a programmable RC circuit for producing a feedback control voltage signal as the emulation signal that represents the inductor current, without direct or indirect sensing or monitoring of the actual or a scaled version of the inductor current.

4. The system of claim 1, wherein the emulation circuit comprises an on-chip resistor element and an on-chip capacitor element, the emulation circuit being configured to produce a feedback control voltage signal as the emulation signal that represents the inductor current, without direct or indirect sensing or monitoring of the actual or a scaled version of the inductor current.

5. The system of claim 3, wherein the feedback control voltage signal is compared with a reference voltage to determine a voltage for current limit protection in the DC—DC converter circuit.

6. The system of claim 4, wherein the emulation circuit comprises a comparator for comparing the feedback control voltage signal with a reference voltage and determining a voltage for current limit protection in the DC—DC converter circuit.

7. A power conversion system, comprising:
   a power converter including an inductor and an emulation circuit, the emulation circuit for coupling to a first voltage supply, a second voltage supply, and a ground terminal, the emulation circuit including
      a first transistor for coupling between the first voltage supply and the ground terminal;
      a programmable resistor coupled between the first transistor and the ground terminal;
      an amplifier having a positive input for coupling to the second voltage supply, a negative input coupled between the first transistor and the programmable resistor, and an output coupled to a gate of the first transistor;
      a programmable capacitor for coupling between the first voltage supply and the ground terminal, so that when the capacitor is coupled to the first voltage supply an emulated inductor current charges the capacitor and an emulated inductor voltage is provided across the capacitor;
      a switch connected across the programmable capacitor;
      a comparator to compare the emulated inductor voltage and a reference voltage; and
      a logic circuit responsive to the output of the comparator to operate the switch to determine an inductor voltage limit.

8. The system of claim 7, wherein the emulation circuit further comprises a second transistor for coupling between the first voltage supply and the first transistor.

9. The system of claim 8, wherein the emulation circuit further comprises a third transistor for coupling between the first voltage supply and the programmable capacitor, respective gates of the second and third transistors being coupled together to form a current mirror circuit.

10. The system of claim 7 further comprising a control circuit coupled to the emulation circuit to receive the emulated inductor voltage and a signal representative of the inductor voltage limit.

11. A power conversion method comprising:
   providing a converter circuit with an inductor having an inductor current;
   emulating the inductor current without direct or indirect sensing or monitoring of the actual or a scaled version of the inductor current;
   producing a voltage signal that represents the inductor current;
   comparing a reference voltage with the voltage signal; and
   producing a voltage signal that represents an inductor current limit based on a result of the comparison.

12. The method of claim 11 further comprising providing feedback control to the converter circuit based on the voltage signals representing the inductor current and the inductor current limit.

13. The method of claim 11 further comprising operating the converter circuit in a continuous conduction mode.

14. The method of claim 11 further comprising operating the converter circuit in a discontinuous conduction mode.

* * * * *